Oct. 13, 1936. H. WEBER 2,057,220
BRAKE TESTING AND ADJUSTING DEVICE
Filed Oct. 26, 1934 2 Sheets-Sheet 1
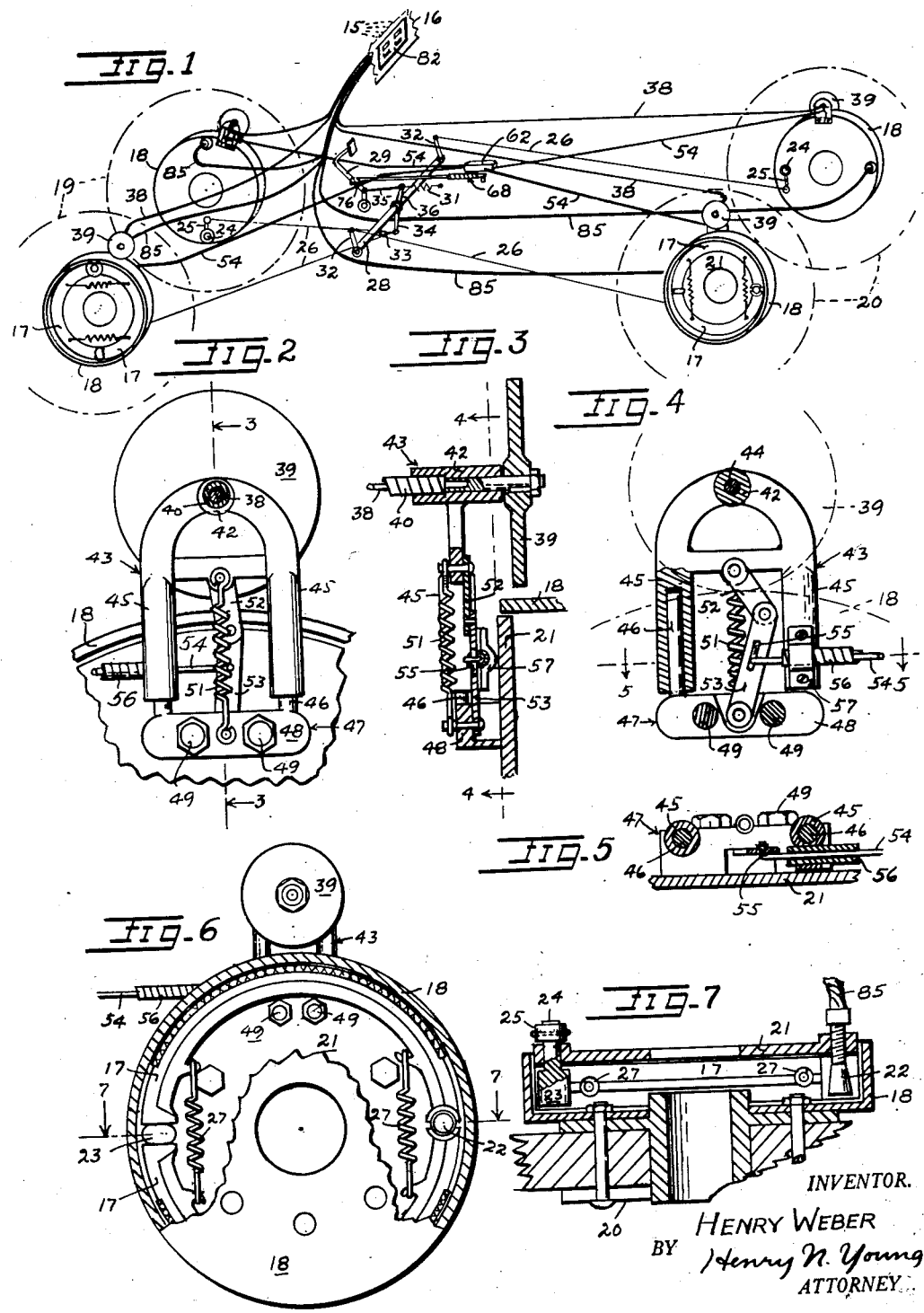
INVENTOR.
HENRY WEBER
BY Henry N. Young
ATTORNEY

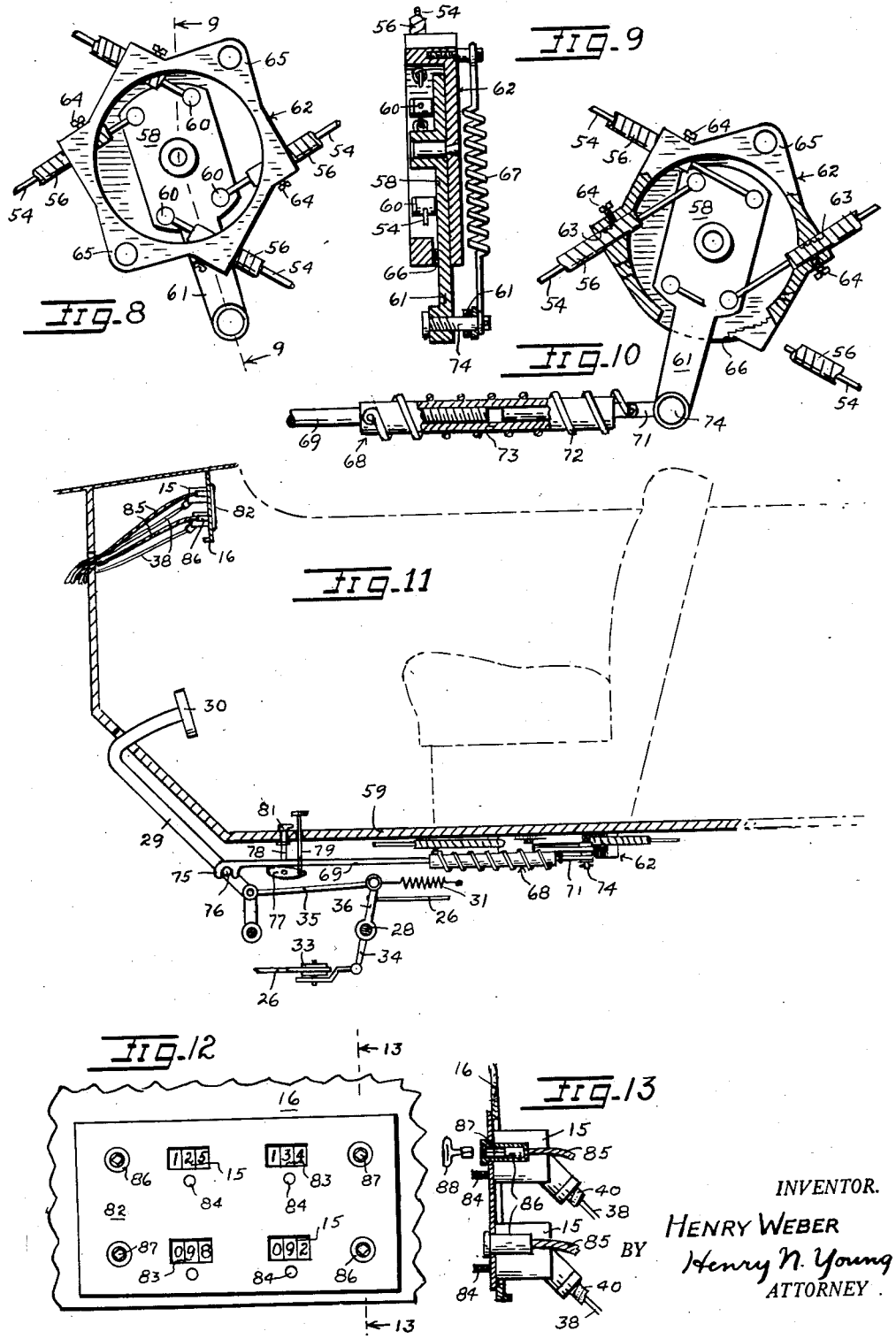

Patented Oct. 13, 1936

2,057,220

UNITED STATES PATENT OFFICE 2,057,220

BRAKE TESTING AND ADJUSTING DEVICE

Henry Weber, Oakland, Calif.

Application October 26, 1934, Serial No. 750,090

5 Claims. (Cl. 73—51)

The invention relates to a device for testing and adjusting the brakes of wheeled vehicles for providing a balanced action thereof.

An object of the invention is to provide for a testing of the brake action while a vehicle is in motion and solely while the vehicle motion is being retarded by the action of the brake assembly being tested.

Another object is to provide for a testing and adjusting of a vehicle brake assembly at any time by the operator and under actual running conditions for the vehicle.

A further object is to provide a brake testing and adjusting means as part of the permanent equipment of a vehicle.

The invention possesses other objects and features of advantage, some of which, with the foregoing, will be set forth or be apparent in the following description of a preferred embodiment of the device and in the accompanying drawings, in which, Figure 1 is a diagrammatic showing of the application of the present device to a four wheel brake assembly for a motor vehicle.

Figure 2 is an inside face view of a unit including a friction wheel for driving a revolution counter of the device, said unit being shown as operatively related to a brake drum of the brake assembly.

Figure 3 is a fragmentary section at 3—3 in Figure 2.

Figure 4 is a view at 4—4 in Figure 3, but with the friction wheel engaging the brake drum.

Figure 5 is a section at 5—5 in Figure 4.

Figure 6 is an elevation of the associated brake drum and counter operating assembly, the view being taken from the outer face of the drum and drum portions being broken away to show the details of the brake mechanism.

Figure 7 is a plan section at 7—7 in Figure 6 and includes certain wheel structure details.

Figure 8 is a plan view of a device for effecting a like control of a plurality of the counter operating wheels.

Figure 9 is a section at 9—9 in Figure 8.

Figure 10 is a view similar to Figure 8, portions of the structure being broken away to disclose its details, and operative parts thereof being differently related than in Figure 8.

Figure 11 is an elevation showing the operative association of the device of Figure 8 with the brake-operating lever of a vehicle.

Figure 12 is a face view of a panel at which the counter indications may be read and at which brake-adjusting shafts terminate.

Figure 13 is a sectional view at 13—13 in Figure 12.

Essentially, the device of my invention comprises the provision of a plurality of revolution counters 15 at a vehicle dash or instrument board 16, means for independently and simultaneously operating said counters from the different vehicle wheels for which brakes are provided and while said brakes are operating, and means operative from the vehicle dash for making any required adjustment of the brakes. The present arrangement is designed to constitute a permanent installation on a vehicle, and provides for both testing and adjusting the brakes at any time and while the vehicle operator is in a usual position in the operator's compartment of the vehicle.

The disclosed wheel braking arrangement is intended as being illustrative of vehicle brake systems generally, and like brake assemblies are assumed to be provided at each wheel. In the present instance, the device of my invention is shown as being associated with a four wheel brake system for an automobile or the like, and each brake assembly is of the internal expansion type and comprises a pair of arcuate brake shoes 17 which are mounted on the front and rear vehicle wheels 19 and 20 respectively, the wheels 19 being the steering wheels at the front of the vehicle.

The brake drums 18 are arranged to be fixed to the different wheels at their inner sides and in coaxial relation thereto, and the brake shoes 17 are mounted on annular plates or flanges 21 of the brake assemblies. For the dirigible front wheels 19, it will be understood that the flanges 21 would be fixed to the usual steering knuckle member which provides the spindle shaft about which the wheel revolves and is fixed to the front axle of the vehicle by means of a king-pin about which it may oscillate between predetermined limits. For the rear vehicle wheels which are fixed on floating axles, the flanges 21 would be fixed at the outer ends of the rear axle housing in a usual manner. Since vehicle wheel mountings vary widely in structure and are aside from the present invention, no specific mountings are herewith shown.

As is particularly brought out in Figures 6 and 7, opposed ends of the brake shoes 17 of a brake assembly at a wheel are complementarily grooved to receive and pivotally engage opposite sides of the head of a conically tapered pin 22 which is threadedly and adjustably mounted in the plate 21 adjacent one edge thereof and extends transversely into the plane of operation of the brake shoes. The other ends of the brake shoes engage opposite sides of a cam 23 of elliptic cross-section, which cam is disposed diametrically of the pin 22 and is carried by a shaft 24 which is journalled in the plate 21 and extends from the inner side thereof. The extending end of the shaft 24 carries a radial arm 25 from which a pull cable 26 extends for use in setting the brake. Tension springs 27 connect the shoes 17 and constantly coact to urge the shoes to maintain a seated engagement with the pin 22 and the cam 23 while yieldingly resisting a shoe-spreading rotation of the cam, it being understood that such a cam rotation is arranged to operatively engage the shoes with the inner drum face if the pin 22 is properly adjusted. The present wheel braking device is of a type which is well known in the art.

The cables 26 are arranged for their simultaneous pulling to set the brakes of the various wheels through their appropriate connection with a brake shaft 28 which is mounted on the vehicle frame and is arranged for rocking to set the brakes by reason of the displacement of a foot brake lever 29 which presents a pedal 30 for engagement by the foot of an operator of the vehicle. A spring 31 is normally operative to urge an inoperative disposal of the brake lever 29. In the present arrangement, the brake-operating cables 26 for the rear wheels 20 extend to radial arms 32 of the shaft 28 and the cables 26 for the front wheels 19 are connected and extend around a pulley 33 which is attached to an arm 34 of the shaft 28. A pull rod 35 connects the foot lever 29 with an arm 36 of the shaft 28, and the whole brake operating arrangement is understood to be such that an actuation of the brake lever is designed to simultaneously set all of the brakes under equalized or balanced pressure conditions.

It will now be recalled that a most efficient brake operation requires an equal effectiveness of the brakes at opposite vehicle wheels, and that the degree of brake operation is preferably somewhat less for the front wheels than for the back wheels for avoiding a "locking" of the front wheels when the brakes are set. But even though the actual working pressures of the different pairs of brakes should be balanced by appropriate adjustments of the disclosed, or another, brake system, the set brakes may not operate equally or maintain an equal effectiveness while in use, and equal pressure equalization usually fails for assuring the most desirable balance of brake effectiveness in both mechanical and hydraulic systems. For the latter reason, an individual testing and adjustment of the brakes under the full range of operating conditions is most desirable, and it is to an appropriate and effective method and means for this purpose that the present invention particularly relates.

As illustrated, the counters 15 are arranged to be driven by and from the various vehicle wheels through the operation of flexible shafts 38 which carry wheels 39 for a suitable driven engagement with the vehicle wheels which are to operate the counters. Conveniently, and as particularly shown, the wheels 39 are arranged to be radially and frictionally engaged with the cylindric exteriors of the brake drums 18 for actuating the shafts 38 and the counters 15, it being understood, however, that the wheels 39 might otherwise engage the vehicle wheels for effecting a rotation of the shafts 38. Preferably, and as shown, each shaft 38 is enclosed in a flexible conduit 40, the ends of said conduit being fixedly secured at the counter and adjacent the counter-operating wheel 39, and the conduits for the front wheel connections having enough slack therein to provide for steering movements of the wheels.

At its end nearest the wheel 39, each conduit 40 is secured within one end of a sleeve 42 which is provided at the cross portion of a U-shaped member 43. The sleeve bore has a short shaft 44 mounted therein, said shaft having one end fixed to the end of the flexible shaft 38 and having the friction wheel 39 mounted on its other end. As shown, the side portions 45 of the member 43 are tubular for slidably receiving cylindric side portions 46 of a U-shaped base member 47 which is arranged for fixed mounting on a plate 21; in the present structure, the cross portion 48 of the member 47 is perforated to receive bolts 49 therethrough for securing it to the plate 21 to dispose the wheel 39 opposite and outwardly of the brake drum 18.

A tension spring 51 is longitudinally coactive between the members 43 and 47 for urging a limiting telescopic engagement of the side portions 45 and 46 of the respective members, and mutually pivoted toggle links 52 and 53 also connect the members. When the links 52 and 53 lie at one side of their line of action, the member 43 is arranged to dispose the friction wheel 39 out of engagement with the brake drum 18, this being the condition which is particularly shown in Figures 2 and 3. When the links 52 and 53 lie at the other side of their line of action, the friction wheel 39 is resiliently engaged with the drum 18 for rotation thereby. It will be noted that the wheel 39 is furthest from the drum when the links 52 and 53 are mutually aligned in an intermediate coactive relation thereof, and that the spring 51 urges the retention of the members 43 and 47 in either set relation, that a snap action of the member 43 is produced as the links are swung from one position to the other, and that the links make a smaller angle with each other when the wheel engages the drum than when it is spaced from the drum, the latter being a necessary corollary of the desired relations.

Means are provided for shifting the positioning of the wheel 39 with respect to the drum, and, as shown, such means comprises the provision of a push-and-pull rod 54 which is arranged for actuation by the operator of the vehicle and has one extremity engaging a slot 55 provided in the link 53 for controlling the positioning of the link. The rod 54 is preferably flexible and may be mounted in a flexible conduit 56 having one end clamped to a portion 45 of the member, as by a clamp plate 57. The portion of the rod 54 adjacent the link 53 is operative substantially in the plane of the links 52 and 53 and in a line perpendicular to the line of action of the links, it being noted that the slot 55 of the link 53 permits the constant disposition of the rod portion thereof in the same line as well as the described snap action movement of the links. With the disclosed arrangement, a pull on the rod 54 is adapted to effect the described movement of the wheel 39 into engagement with the brake drum 18, while a push on the rod in the reverse direction is adapted to restore the wheel to its inoperative position.

It will now be noted that the rods 54 are arranged to be actuated together and by like amounts for engaging or releasing the counter operating wheels with respect to the vehicle wheels. Accordingly, and as shown, the rods 54 all extend to a plate member 58 which is arranged for mounting on and beneath the vehicle floor 59 at a point centrally of the vehicle, and is rotative in its mounting about an upright axis. As particularly shown, the rods 54 approach the plate 58 at different angles, and are fixed to pins 60 which are swiveled to the plate at points thereof which are at equal distances from the pivotal axis of the plate. An arm 61 extends laterally and fixedly from the plate 58 for use in oscillating the plate to simultaneously pull or push the rods in like degrees and for the described purpose, it being noted that the lines of the rod portions overlying the plate 58 are always tangent to the same circle.

The plate 58 is mounted in a generally circular and cup-like casing 62 having a side wall which provides generally tangential bores 63 in which the ends of the conduits 56 may be fixed as by the use of set-screws 64. Perforated ears 65 extend from the top edge of the casing 62 for use in securing the casing in fixed position on the floor 59, as by the indicated use of bolts. A slot 66 is provided in the casing side wall for the protrusion of the arm 61 therethrough and from the casing, and a tension spring 67 extends from the free arm end to an anchorage on the casing bottom at a point which is diametrically opposite the arm when the plate is generally central of the two limiting positions which the rods 54 permit it to assume. The arrangement is such that the arm 61 is resiliently urged to maintain either limiting position in which it may be disposed, and its movement toward the other position becomes a snap action after the arm has passed a mutually parallel relation with the spring. The limiting position of the arm 61 and the plate 58 when the wheels 39 are disengaged from the brake drums 18 is shown in Figure 8, while Figure 10 discloses the relations when the wheels engage the brake drums.

It will now be noted that the swinging actuation of the member 58 to operably engage the wheels 39 with the brake drums is adapted to be effected by and upon a brake-setting operation of the brake lever 29. Accordingly, and as disclosed in detail in Figures 10 and 11, a link-bar assembly 68 is provided for connecting the outer end of the arm 61 with the brake lever, said assembly comprising normally abutting coaxial rods 69 and 71 which are connected for a limited axial separation by a helical spring 72 which is engaged about a sleeve 73 which is adjustably fixed on the rod 69 and slidably receives the rod 71. As shown, one end of the spring 72 is fixed to the sleeve 73 and the other spring end is fixed to the rod 71, and the rod 71 is connected to the arm 61 by means of a pivot pin 74 which also engages one end of the spring 67.

At its brake-engaging end, the rod 69 is provided with a fork portion 75 which opens downwardly and is arranged to span a pin 76 which extends laterally from the brake lever 29 at a point thereof which is so spaced from the lever fulcrum that the travel of the pin 76 as the lever is rocked to set the brakes somewhat exceeds the permitted movement of the pin 74 for insuring a shifting of the arm 61 to engage the friction wheels 39 with the drums 18; the arrangement is such as to permit the described snap action of the arm 61 and a movement of the brake lever to fully set the brakes. When the brake lever is released, the return movement thereof is arranged to effect a reverse movement of the arm to thereby displace the friction wheels to their normally inoperative positions; if necessary, the foot pedal 30 may be pulled back by hand for insuring the latter action.

The fork 75 is normally held out of engagement with the pin 76 whereby the operation of the counters is effected only when a testing of the brake effectiveness is specifically desired. As is particularly shown, the rod 69 overlies a plate cam 77 which is pivotally mounted on a hanger bar 78 which depends from the floor 59. A push rod 79 extends upwardly from the cam and through the floor whereby, when the rod 79 is pushed downwardly, the cam 77 engages beneath the rod 69 to lift the same out of engagement with the pin 76 on the brake lever; the head of the rod 79 normally engages a catch 81 which is provided at the floor, and the release of the rod 79 from the catch is arranged to permit a lowering of the rod 69 to engage the fork 75 across the pin 76 when the brake lever is in its normally inoperative position.

It will now be noted that the four counters 15 are mounted at the back of a panel 82 which is fixed to the instrument board 16 and provides sight openings 83 at which the counter indications may be viewed. The particular internal structure of the counters is generally immaterial to the present invention, it being generally desirable, though not necessary, that the counter indications be arranged for setting at zero before each test, as by the use of setting knobs 84 which protrude from the counters and panel. If desired, the counters may be calibrated as cyclometers or otherwise calibrated. Preferably, and as shown, the arrangement of the sight openings 83 corresponds to the arrangement of the wheels for which test readings are to be taken, whereby the association of the counters and corresponding wheels may be self-evident.

As shown, the pivot pins 22 of the brake assemblies extend through and beyond the plates 21 which they threadedly engage, and are arranged for rotation in their mountings for longitudinal adjustment to adjustably space the brake-shoe ends which bear on their heads, whereby to provide for an adjustment of the operativeness of the brake shoes with respect to the drums for a given degree of rotation of the cam 23. Flexible shafts 85 extend from the inner ends of the brake pins 22 to sockets 86 provided in the panel 82, said sockets being preferably arranged in the panel 82 in a corresponding manner to the counter sight openings 83. The shafts 85 present end portions 87 of polygonal section within the sockets 86 for selective engagement by a suitable socket wrench 88 for rotating the shafts to adjust the individual brakes as may be required.

Assuming that the vehicle equipped as described is traveling along a level road providing a uniform pavement surface and that the fork 75 engages the pin 76 of the brake lever 29, a testing of the effectiveness of the brakes at the different braked wheels is effected merely by setting the brakes for a period, and thereafter comparing the various counter readings to ascertain the relative effectiveness of the brakes at the different wheels; the larger readings indicate the least effective brakes. If an unbalanced condition is found between the two front wheels or between the two rear wheels, or if the ratio of readings for the front and back wheels is different from a desired value thereof, the brakes are appropriately adjusted through the application of the wrench 88 to the appropriate shafts 84 at the panel 82, after which testing and adjusting may be alternated until a satisfactory operating balance of the brakes is made. The counter readings shown in Figure 12 are those which might result from a test made in accordance with the testing actuation of the brakes.

It will be understood that, with the present arrangement and apparatus, a brake testing may be that during which is brought to rest by the action of the brakes, or may be a lesser period of retardation of the vehicle motion through the action of the brakes. Furthermore, the test of brake effectiveness may be made at all speeds of the vehicle, and is arranged to be made only while deceleration of the vehicle is being effected under the influence of the brakes. If desired, the brake lever may be actuated to a degree which just causes the engagement of the friction wheels with the brake drums and does not set the brakes; under these conditions the counter indications will disclose any difference in the rotative rates of the wheels by reason of any brake drag or difference of tire sizes or in tire tread conditions, etc.

From the foregoing description taken in connection with the accompanying drawings, the advantages of the construction and method of operation will be readily understood by those skilled in the art to which the invention appertains. While I have described the features and method of use of a device which I now consider to be a preferred embodiment of my invention, I desire to have it understood that the showing is primarily illustrative, and that such changes may be made, when desired, as fall within the scope of the following claims.

I claim:

1. In a wheeled vehicle, a supporting wheel having a braking means associated therewith and including a brake drum on the wheel, means to set the brake at said wheel, a revolution counter carried by the vehicle and disposed for its observation by a person operating the vehicle on and over a roadway in a normal manner, a friction wheel for engaging said brake drum and connected with said counter for actuating the same, a member supporting said friction wheel for movement in a fixed path to and from its engagement with said drum, means supporting said member in fixed relation to the wheel axis, and means whereby an actuation of said brake-setting means is arranged to engage said friction wheel with the drum for actuating the counter in accordance with the drum rotation.

2. In a wheeled vehicle, supporting wheels having braking means associated therewith and including a brake drum on the wheel, means to simultaneously set the brakes of said wheels, revolution counters carried by the vehicle and disposed for simultaneous observation by a person operating the vehicle on and along a roadway in a normal manner, there being a counter for each said wheel, friction wheels for engagement with said drums and connected with the different counters for independently actuating the same, members supporting said friction wheels adjacent the respective brake drums and for movements in fixed paths to and from positions of engagement with the drums, means supporting said members in fixed relation to the axes of the respective wheels, and means whereby an actuation of said brake-setting means is arranged to simultaneously engage said friction wheels with the drums for actuating the different counters.

3. In a wheeled vehicle, a supporting wheel having a braking means associated therewith, means to set the brake at said wheel, a revolution counter carried by the vehicle, a friction wheel for engaging said vehicle wheel and connected with said counter for actuating the same, a member supporting said friction wheel for movement in a fixed path to and from its engagement with said vehicle wheel, means supporting said member in fixed relation to the wheel axis, and means whereby an actuation of said brake-setting means is arranged to engage said friction wheel with the vehicle wheel for actuating the counter in accordance with the vehicle wheel rotation.

4. In a wheeled vehicle, a supporting wheel having a braking means associated therewith, means to set the brake at said wheel, a revolution counter carried by the vehicle, a normally inoperative element for engagement by the vehicle wheel for its operation and connected with said counter for actuating the same, a member supporting said element for movement to and from its position for engagement with said vehicle wheel, means supporting said member in fixed relation to the wheel axis, and means whereby an actuation of said brake-setting means is arranged to dispose said element for its engagement by the vehicle wheel for actuating the counter in accordance with the vehicle wheel rotation.

5. In a wheeled vehicle, supporting wheels having braking means associated therewith, means to simultaneously set the brakes of said wheels, revolution counters carried by the vehicle and disposed for simultaneous observation by a person operating the vehicle, there being a counter for each said wheel, elements for operative engagement with said vehicle wheels and connected with the different counters for independently actuating the same, members supporting said elements adjacent the respective wheels and for movements to and from positions of engagement with the wheels, means supporting said members in fixed relation to the axes of the respective wheels, and means whereby an actuation of said brake-setting means is arranged to simultaneously engage said elements with the wheels for actuating the different counters.

HENRY WEBER.